(12) United States Patent
Herlöfsson

(10) Patent No.: US 9,977,645 B2
(45) Date of Patent: May 22, 2018

(54) DYNAMIC MODIFICATION OF AUDIO CONTENT

(71) Applicant: Moodelizer AB, Stockholm (SE)

(72) Inventor: Carl-Michael Herlöfsson, Skärholmen (SE)

(73) Assignee: MOODELIZER AB, Stockholm (SE)

( * ) Notice: Subject to any disclaimer, the term of this patent is extended or adjusted under 35 U.S.C. 154(b) by 225 days.

(21) Appl. No.: 14/873,118

(22) Filed: Oct. 1, 2015

(65) Prior Publication Data

US 2017/0097803 A1    Apr. 6, 2017

(51) Int. Cl.
  *G06F 3/16*       (2006.01)
  *H04R 3/04*       (2006.01)
  *H04H 60/04*      (2008.01)
  *H04S 7/00*       (2006.01)

(52) U.S. Cl.
  CPC ............ *G06F 3/165* (2013.01); *H04H 60/04* (2013.01); *H04R 3/04* (2013.01); *H04S 7/307* (2013.01)

(58) Field of Classification Search
  CPC . G06F 3/165; G06F 3/16; G06F 17/30; H04S 7/307; H04H 60/04; H04R 3/04; G11B 20/10; G11B 27/038; G10L 21/055
  USPC ......................................................... 381/98
  See application file for complete search history.

(56) References Cited

U.S. PATENT DOCUMENTS

| 4,479,240 A | 10/1984 | McKinley, Jr. | |
|---|---|---|---|
| 5,663,517 A | 9/1997 | Oppenheim | |
| 6,215,059 B1 * | 4/2001 | Rauchi | G10H 1/0025 84/611 |
| 7,525,037 B2 * | 4/2009 | Hansson | G11B 27/038 84/609 |
| 8,219,223 B1 * | 7/2012 | Ramirez | H04H 60/04 381/119 |
| 8,278,545 B2 * | 10/2012 | Hamanaka | G10H 1/0025 84/609 |
| 8,583,817 B2 * | 11/2013 | Dolph | H04N 21/234345 709/231 |
| 8,891,794 B1 * | 11/2014 | Lin | H04R 1/1091 381/313 |
| 9,332,370 B2 * | 5/2016 | Zajac | H04S 3/008 |

(Continued)

FOREIGN PATENT DOCUMENTS

EP    2925008 A1    9/2015

OTHER PUBLICATIONS

International Search Report and Written Opinion received for PCT Patent Application No. PCT/SE2016/050931, dated Feb. 13, 2017, 16 pages.

*Primary Examiner* — Oyesola C Ojo
(74) *Attorney, Agent, or Firm* — Morrison & Foerster LLP

(57) ABSTRACT

A method for dynamic modification of audio content. An audio content theme includes audio information relating to at least one theme variation. The method includes the steps of: receiving an intensity parameter indicative of an amount of audio information being played and a variation parameter indicative of at least one theme variation of the audio information being played; modifying, based on said intensity parameter, the amount of audio information being played, and, based on said variation parameter, the at least one theme variation of the audio information being played. Also described is a computer program configured to be executed on a computer device for dynamic modification of an audio content theme.

11 Claims, 6 Drawing Sheets

(56) References Cited

U.S. PATENT DOCUMENTS

| | | | | |
|---|---|---|---|---|
| 9,697,813 | B2* | 7/2017 | Lyske | G10H 1/40 |
| 2002/0172379 | A1* | 11/2002 | Cliff | G11B 27/002 |
| | | | | 381/119 |
| 2004/0005064 | A1* | 1/2004 | Griesinger | G01S 3/8083 |
| | | | | 381/17 |
| 2007/0286426 | A1* | 12/2007 | Xiang | H04M 1/6016 |
| | | | | 381/17 |
| 2008/0086687 | A1 | 4/2008 | Sakai et al. | |
| 2008/0249644 | A1* | 10/2008 | Jehan | G11B 27/038 |
| | | | | 700/94 |
| 2009/0024234 | A1* | 1/2009 | Archibald | G11B 27/038 |
| | | | | 700/94 |
| 2012/0060668 | A1* | 3/2012 | Lengeling | G10H 1/42 |
| | | | | 84/645 |
| 2016/0179946 | A1* | 6/2016 | Stadler | G11B 27/038 |
| | | | | 707/728 |

\* cited by examiner

DYNAMIC MODIFICATION OF AUDIO CONTENT

FIELD

The present disclosure relates a method for dynamic modification of audio content. Further, the disclosure relates to a computer program configured to be executed on a computer device for dynamic modification of audio content.

BACKGROUND

There is currently a plurality of audio modification software programs and related audio and music modification tools available on the market. The most common solution may be to allow a user to play several audio data files simultaneously, containing sounds such as music instruments, voices, industrial sounds or natural sounds etc. Further, in state of the art of software modification tools, it is common to enable a user to increase or decrease the output volume from different audio data files by adjusting one volume fader corresponding to each audio file. This is opening up the possibility for dynamic modification of audio content if the user is provided with a plurality of audio files. However, advanced dynamic modification of audio content on existing audio modification software programs requires a plurality of volume faders, a plurality of actions by the user and consequently an advanced skill level of the user. In addition to the skills required, it is often time consuming to modify audio information in a preferred manner with existing audio modification software programs. Hence, there is a need to provide an audio modification software program that is easier to use and that makes advanced dynamic modification of audio content possible with fewer faders, fewer actions, in less time and that is adapted for users with a lower skill level.

SUMMARY

The present disclosure relates to a method for dynamic modification of audio content. An audio content theme comprises audio information relating to at least one theme variation. The method comprises the steps of: receiving an intensity parameter indicative of an amount of audio information being played and a variation parameter indicative of at least one theme variation of the audio information being played; modifying, based on said intensity parameter, the amount of audio information being played, and, based on said variation parameter, the at least one theme variation of the audio information being played. An advantage of the method is that the modification of audio content is simplified.

According to one example, the audio content theme comprises a plurality of audio files, related to the same theme variation, each of which audio file comprising a different amount of audio information, such that, when modifying the intensity parameter, the at least one audio file being played is changed to at least one audio file comprising a different amount of audio information. An advantage associated with this feature is that a change between two different amounts of audio information being played is further facilitated.

According to a further example, a plurality of audio files are being played at the same time and wherein modifying the amount of audio information being played comprises increasing the amplitude of one of the plurality of audio files being played and/or decreasing the amplitude of another of the plurality of audio files being played. An advantage associated with this functionality is that a smoother transition between the audio files can be obtained, which enhances the audio experience of the user.

According to another example, the audio content theme comprises a plurality of audio files, related to the same amount of audio information, each of which audio file comprising a different theme variation, such that, when modifying the variation parameter, the at least one audio file being played is changed to at least one audio file comprising a different theme variation. An advantage is that it is further facilitated to change between two different theme variations of the audio information being played.

Further, the disclosure relates to a computer program configured to be executed on a computer device for dynamic modification of an audio content theme. The audio content theme comprises audio information relating to at least one theme variation. The computer program is configured to store an intensity parameter on the computer device indicative of an amount of audio information being played and a variation parameter indicative of at least one theme variation of the audio information being played. The computer program is configured to modify, based on a modification of said intensity parameter, the amount of audio information being played and, based on a modification of said variation parameter, the at least one theme variation of the audio information being played. An advantage of the computer program is that the modification of audio content is simplified, and requires less skills and prior experience of the user in order to obtain the same result as a skilled user of existing audio modification tools.

Yet further, the disclosure relates to the use of the computer program for adding audio to a motion picture.

BRIEF DESCRIPTION OF THE DRAWINGS

Embodiments will be further described with reference to the accompanying drawings.

DETAILED DESCRIPTION

Figure 1:
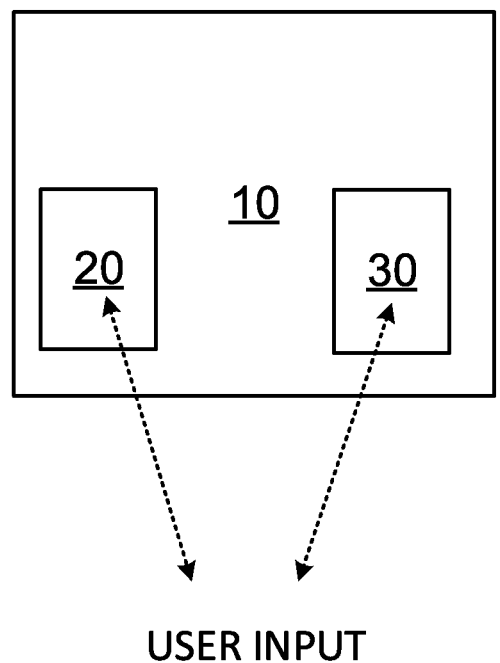
FIG. 1 illustrates an overview of the computer program according to one embodiment.

FIG. 1 illustrates an overview of a computer program 10 according to one embodiment. The computer program 10 is configured to be executed on a computer device for dynamic modification of audio content. The audio content theme comprises audio information relating to at least one theme variation. The amount of audio information corresponds to the amount of complexity in the audio data waveform. The computer program 10 is configured to store an intensity parameter 20 on the computer device indicative of an amount of audio information being played and a variation parameter 30 indicative of at least one theme variation of the audio information being played. The computer program 10 is configured to modify, based on a modification of said intensity parameter 20, the amount of audio information being played and, based on a modification of said variation parameter 30, the at least one theme variation of the audio information being played. The intensity parameter 20 and the variation parameter 30 may be modified through a user input.

The computer program 10 for dynamic modification of audio information comprises a plurality of audio files. Each of the audio files may have been recorded before being entered into the computer program 10. In order to obtain a good result the audio files in the audio content theme may have the same beats per minute and duration. The audio file may comprise any plurality of sounds or instruments. However, in order to obtain an improved result of the dynamic modification of audio content, the music files have to be carefully recorded, so that a plurality of music files only differs from each other by having different amount of audio information being played, and so that a plurality of music files only differs from each other by having different theme variations of audio information being played. When using an audio content theme all audio files in the audio content theme are started simultaneously. The intensity parameter 20 and the variation parameter 30 are specifying which audio files are being played to the user. The intensity parameter 20 controls how much audio information will be played at any given time. The variation parameter 30 controls which variation of audio information will be played at any given time.

Figure 2:
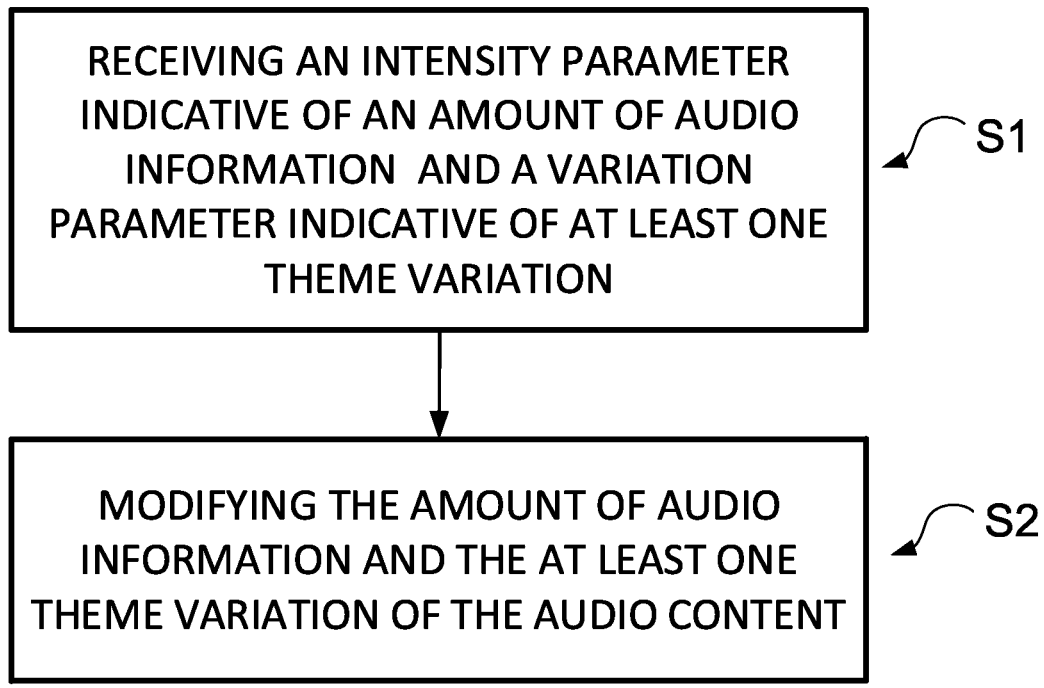
FIG. 2 shows a flow diagram of a method for dynamic modification of audio content.

FIG. 2 shows a flow diagram of a method for dynamic modification of an audio content theme. The audio content theme comprises audio information relating to at least one theme variation. The method comprises the following steps: Receiving at step S1 an intensity parameter 20 indicative of an amount of audio information being played and a variation parameter 30 indicative of at least one theme variation of the audio information being played; Modifying at step S2, based on said intensity parameter 20, the amount of audio information being played, and, based on said variation parameter 30, the at least one theme variation of the audio information being played.

According to one example, the audio content theme comprises a plurality of audio files, related to the same theme variation. Each audio file comprises a different amount of audio information, such that, when modifying the intensity parameter 20, the at least one audio file being played is changed to at least one audio file comprising a different amount of audio information. Modifying the amount of audio information being played may comprise: modifying the frequency of notes being played by changing which of the at least one audio file that is being played; modifying complexity, sonic structure or harmonic content of audio information being played, by changing which of the at least one audio file that is being played; modifying the plurality of instruments being played at the same time by changing which of the at least one audio file being played; and/or modifying the amplitude of the audio information being played without changing which of the at least one audio file that is being played.

According to another example, the audio content theme comprises a plurality of audio files related to the theme variation of the audio information being played, wherein the theme variation can be modified by modifying the variation parameter 30. Further, the audio content theme may comprise a plurality of audio files, related to the same amount of audio information, each of which audio file comprising a different theme variation, such that, when modifying the variation parameter 30, the at least one audio file being played is changed to at least one audio file comprising a different theme variation.

The modifying of the at least one theme variation of the audio information being played may comprise: modifying the combination of music instruments being played by changing which of the at least one audio file that is being played; and/or modifying complexity, sonic structure or harmonic content of audio information being played, by changing which of the at least one audio file that is being played.

Figure 3:
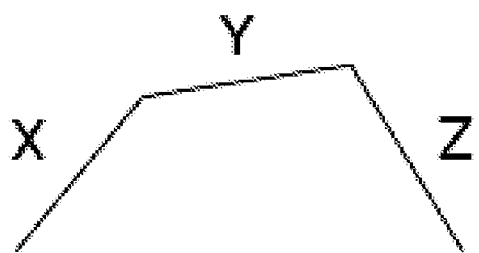
FIG. 3 shows an example of a view of the amplitude change of a music file as presented to a user of the computer program.

FIG. 3 shows an example of a view of the amplitude change of a music file as presented to a user of the computer program. Upwards represents amplitude and rightwards represents the intensity parameter 20. The music file is in this example illustrated by three regions X, Y and Z. When being in the region of X, a change to the right, which indicates increase in the intensity parameter 20, results in larger amplitude increase of the music file. When being in the region of Y, a change to the right, which indicates to increase in the intensity parameter 20, results in smaller amplitude increase of the music file. Finally, when being in the region of Z, a change to the right results in an amplitude decrease of the music file.

According to one example, the user may change the slope of the regions X, Y, Z in order to modify the amplitude change when moving to the right or left in a variation.

Figure 4:
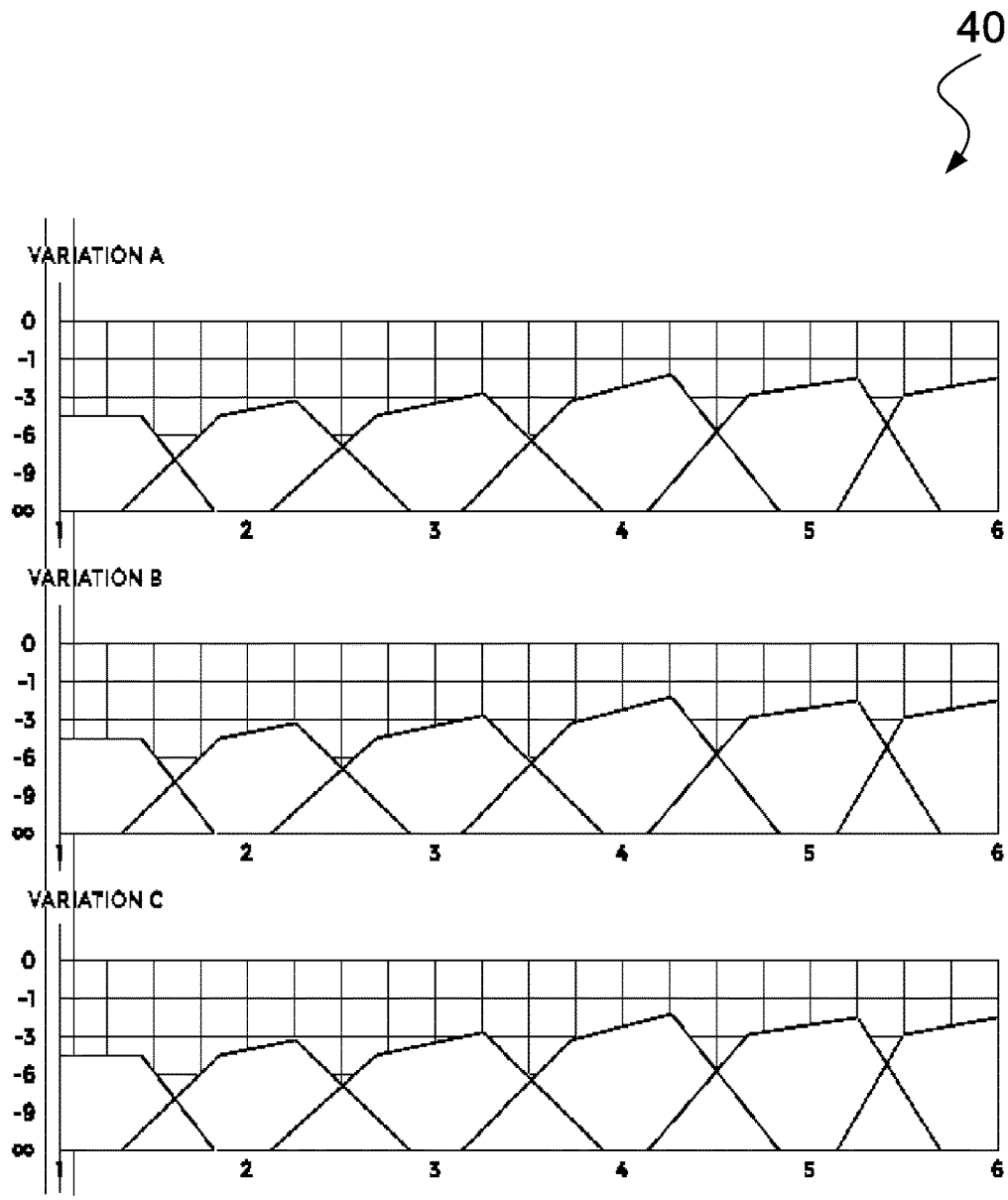
FIG. 4 shows an example of a composer view of the computer program comprising a plurality of music files for the amount of audio information being played and plurality of music files for theme variations of the audio information.

FIG. 4 shows an example of a composer view 40 of the computer program 10 comprising a plurality of audio files for the amount of audio information being played and plurality of audio files for theme variations of the audio information being played. There are a plurality of audio files in each of variation A, variation B and variation C. The audio files, within the same variation, only differ from each other by having different amount of audio information being played. Those audio files may be labelled with an intensity level, wherein a higher intensity level represents a higher amount of audio information being played. In the example of FIG. 4 there are six intensity levels, level 1-6, within each variation. Each one of the plurality of audio files, related to the amount of audio information, that is played, may be modified by the intensity parameter 20. The audio files within the same intensity level only differ from each other by having different theme variations of audio information being played. Each one of the plurality of audio files that is played, related to the theme variation of the audio information being played, may be modified by the variation parameter 30.

According to one example, where only one music file is played only the amplitude of the music file being played is changed, when modifying the intensity parameter 20 as illustrated by FIG. 3. According to another example, where two music files are played at the same time the amplitude of one of the music files increases and the amplitude of the other of the music files decreases, when modifying the intensity parameter 20 as illustrated in FIG. 4 by each of the crossing of two music files forming a transfer region, such as for example the transfer region between intensity level 1 and intensity level 2 within variation A or the transfer region between intensity level 4 and intensity level 5 within variation C. Hence, a smooth transition called crossfade between music files within one variation can be achieved.

According to an example, the user may change each of the crossing slopes in the transfer region between two music files in order to modify the amplitude change of each of the two music files when moving to the right or left in a transfer region within a variation.

According to another example, where two music files are played at the same time the amplitude of one of the music files increases and the amplitude of the other of the music files decreases, when modifying the variation parameter 30 as illustrated in FIG. 4 by each of the crossing of two music files forming a transfer region, such as for example the transfer region between variation A and variation B within intensity 1 or the transfer region between variation B and variation C within intensity 5. Hence, a smooth transition called a crossfade between music files within one intensity level can be achieved.

The audio files are constructed and composed in such a way that the lowest intensity level only consists of very little musical information. A solo violin or some high pitched piano notes for example. The audio file(s) on the next intensity level comprises what is in the first level but with added audio material. The added audio material may be for example a few more notes on the violin or a piano chord. The audio file(s) on every further intensity level comprises even further added audio material. The computer program 10 crossfades between the intensity audio files to create a seamless transition over time.

The variations are versions of the music that, in different ways, are able to play together with each other. Crossfades are also made between variations A, B and C. In that way the control pad is created that makes it possible to move around in the theme in any two-dimensional direction, resulting in that crossfades between intensities and variations can occur at the same time. According to a further example, a plurality of audio files are being played at the same time and wherein modifying theme variation being played comprises increasing the amplitude of one of the plurality of audio files being played which is related to one variation and decreasing the amplitude of another of the plurality of audio files being played which is related to another variation. An advantage associated with this functionality is that a smoother transition between the audio files can be obtained, which enhances the audio experience of the user.

Below follows an example of an audio content theme where the intensity is implemented by audio files on six different intensity levels:

Intensity one: Ambient feeling without too much rhythm or bass. Audio information is kept to a minimum.

Intensity two: Elements of chords and melodies are added. Rhythms and drums are avoided.

Intensity three: The musical intentions should be fairly obvious by now. Rhythmical elements are introduced.

Intensity four: A "medium" version of the music. Bass should be present at this point.

Intensity five: A full representation of the audio content theme containing all elements but still with that last level held back.

Intensity six: Maximum climax of the variation

There are generally two types of musical elements in an audio content theme. Some musical elements should create the variation between A, B and C. Other musical elements should work as glue for the whole audio content theme. Variations A, B and C may have three different rhythmic elements. Further, variations A, B and C may have a pad that is the same in all variations and makes the audio content theme unified.

Variations can be implemented in many different ways. Below is an example of variations:
  Variation A: Piano only
  Variation B: Piano and strings
  Variation C: Piano, strings and percussion The tones of the piano may be the same in variation A, B and C. Likewise, the tones of the strings may be the same in variation B and C.

Figure 5:
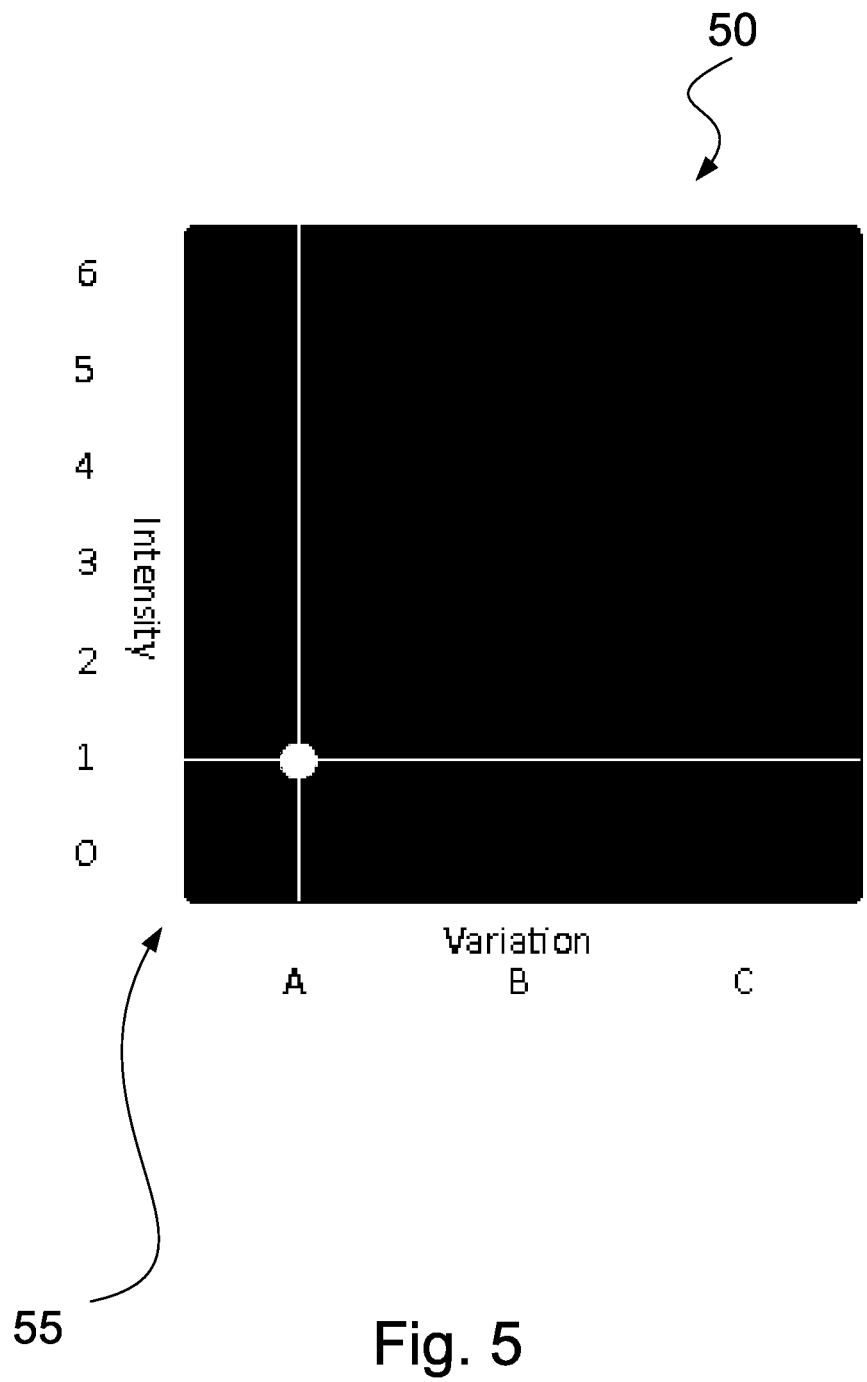
FIG. 5 shows an example of a graphical user interface of the computer program for modifying an intensity parameter indicative of an amount of audio information being played and a variation parameter indicative of at least one theme variation of the audio information being played.
Figure 6:
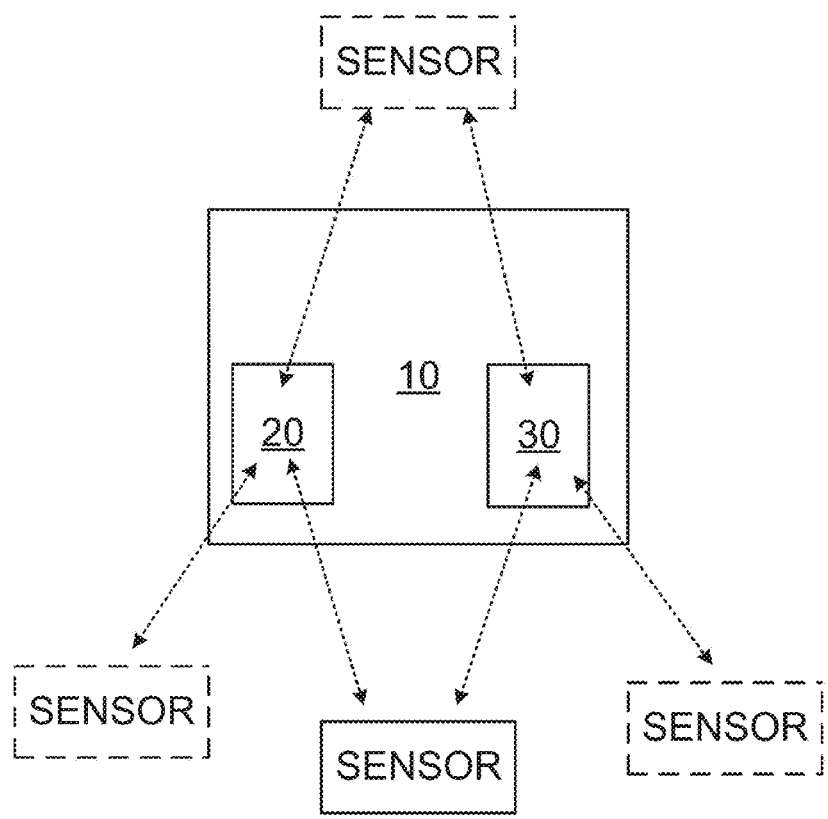
FIG. 6 illustrates an overview of the computer program according to one embodiment.

FIG. 5 shows an example of a graphical user interface 50 of the computer program 10 for modifying an intensity parameter 20 indicative of an amount of audio information being played and a variation parameter 30 indicative of at least one theme variation of the audio information being played. The computer program 10 may be configured to control a graphical user interface 50 of the computer device 10 for visualization of the intensity parameter 20 and the variation parameter 30. The intensity and variation parameters 20, 30 may be manually adjustable by at least one graphical input indicator 55 on said graphical user interface 50. According to the example of FIG. 5, the graphical user interface 50 comprises a two-dimensional coordinate system, wherein one dimension represents the intensity parameter 20 and the other dimension represents the variation parameter 30. The at least one graphical input indicator 55 is constituted by a graphical coordinate indicator being movable on the graphical user interface 50 in any two-dimensional direction. The graphical user interface 50 is built up by the music files of the composer view 40 in FIG. 4. However, in the graphical user interface 50 it is not possible to change the crossing slopes in the transfer region between two music files. Up to four music files can have an amplitude larger than zero at the same time if the graphical coordinate indicator is situated in between two intensity parameter 20 and two variation parameter 30.

If the computer program is started at variation A, intensity 1 (A1), as shown in FIG. 5, then only the music file A1 has amplitude larger than zero. If the position of the graphical coordinate indicator is moved up towards variation A, intensity 2 (A2), then the amplitude of the music file A1 is decreased, while the amplitude of the music file A2 is increased. When the graphical coordinate indicator has been moved to A2, then only the music file A2 has amplitude larger than zero. If the position of the graphical coordinate indicator is moved up towards variation A, intensity 3 (A3), then the amplitude of the music file A2 is decreased, while the amplitude of the music file A3 is increased. When the graphical coordinate indicator has been moved to A3, then only the music file A3 has amplitude larger than zero. If the graphical coordinate indicator is moved towards variation A, intensity 6, the same procedure regarding decrease and increase of music files respectively takes place for each music file on each intensity level. Consequently, if the graphical coordinate indicator is moved to a lower intensity then the amplitude of the music files is crossfaded towards the lower intensity. If the graphical coordinate indicator is positioned on variation B, intensity 5 (B5), then only the music file B5 has amplitude larger than zero. If the position of the graphical coordinate indicator is moved down towards variation B, intensity 4 (B4), then the amplitude of the music file B5 is decreased, while the amplitude of the music file B4 is increased. When the graphical coordinate indicator has been moved to B4, then only the music file B4 has amplitude larger than zero. The same applies the graphical coordinate indicator is moved between different variations. If the graphical input indicator 55 is positioned on variation B, intensity 4 (B4), then only the music file B4 has amplitude larger than zero. If the position of the graphical coordinate indicator is moved to the right towards variation C, intensity 4 (C4), then the amplitude of the music file B4 is decreased, while the amplitude of the music file C4 is increased. When the graphical coordinate indicator has been moved to C4, then only the music file C4 has amplitude larger than zero.

According to an example, the computer device is platform independent and suitable to use on any computer device such as computer, tablet or smartphone.

According to an example, the computer program 10 is used for adding audio to a motion picture.

According to an example, the computer program 10 is used for adding audio in real time to real life events by modification of the intensity parameter 20 and the variation parameter 30 from sensors that react to real life stimuli such as, receiving gyroscopic data from a mobile phone device and converting that data to modify the intensity parameter 20 and the variation parameter 30.

What is claimed is:

1. A method for dynamic modification of an audio content theme, the audio content theme comprising audio information relating to at least one theme variation, the method comprising the steps of:
    receiving an intensity parameter indicative of an amount of audio information being played and a variation parameter indicative of at least one theme variation of the audio information being played; and
    modifying, based on a modification of said intensity parameter, the amount of audio information being played, and, based on a modification of said variation parameter, the at least one theme variation of the audio information being played,
        wherein the audio content theme comprises a plurality of audio files, related to the same theme variation, each of which audio files comprises a different amount of audio information, such that, when modifying the intensity parameter, at least one audio file being played is changed to at least one audio file comprising a different amount of audio information,
        wherein the audio content theme further comprises a plurality of audio files, related to the same amount of audio information, each of which audio file comprises a different theme variation, such that, when modifying the variation parameter, at least one audio file being played is changed to at least one audio file comprising a different theme variation,
        wherein modifying the amount of audio information being played comprises modifying a plurality of instruments being played at the same time by changing which of the at least one audio file being played, and
        wherein modifying the at least one theme variation of the audio information being played comprises modifying the combination of music instruments being played by changing which of the at least one audio file being played.

2. The method according to claim 1, wherein the audio content theme is based on audio information from a plurality of audio files, each of the plurality of audio files having the same beats per minute and duration, wherein at least one audio file of the plurality of audio files is being played at a time.

3. The method according to claim 2, wherein modifying the amount of audio information being played comprises at least one of:
    modifying the frequency of notes being played by changing which of the at least one audio file that is being played; and
    modifying the amplitude of the audio information being played without changing which of the at least one audio file that is being played.

4. The method according to claim 1, wherein a plurality of audio files are being played at the same time and wherein modifying the amount of audio information being played comprises increasing the amplitude of one of the plurality of audio files being played and/or decreasing the amplitude of another of the plurality of audio files being played.

5. The method according to claim 1, wherein modifying the at least one theme variation of the audio information being played comprises at least one of:
    modifying the combination of music instruments being played by changing which of the at least one audio file that is being played; and
    modifying complexity, sonic structure or harmonic content of audio information being played, by changing which of the at least one audio file that is being played.

6. A non-transitory computer readable storage medium having stored thereon a computer program configured to be executed on a computer device for dynamic modification of an audio content theme, the audio content theme comprising audio information relating to at least one theme variation, the computer program being configured to store an intensity parameter on the computer device indicative of an amount of audio information being played and a variation parameter indicative of at least one theme variation of the audio information being played, wherein the computer program is configured to modify, based on a modification of said intensity parameter, the amount of audio information being played and, based on a modification of said variation parameter, the at least one theme variation of the audio information being played,
    wherein the audio content theme comprises a plurality of audio files, related to the same theme variation, each of which audio files comprises a different amount of audio information, such that, when modifying the intensity parameter, at least one audio file being played is changed to at least one audio file comprising a different amount of audio information,
    wherein the audio content theme further comprises a plurality of audio files, related to the same amount of audio information, each of which audio file comprises a different theme variation, such that, when modifying the variation parameter, at least one audio file being played is changed to at least one audio file comprising a different theme variation,
    wherein modifying the amount of audio information being played comprises modifying a plurality of instruments being played at the same time by changing which of the at least one audio file being played, and
    wherein modifying the at least one theme variation of the audio information being played comprises modifying the combination of music instruments being played by changing which of the at least one audio file being played.

7. The storage medium according to claim 6, wherein the computer program is further configured to control a graphical user interface of the computer device for visualization of the intensity parameter and the variation parameter, wherein the intensity and variation parameters are manually adjustable by at least one graphical input indicator on said graphical user interface.

8. The storage medium according to claim 7, wherein said graphical user interface comprises a two-dimensional coordinate system, one dimension representing the intensity parameter and the other dimension representing the variation parameter, wherein the at least one graphical input indicator is constituted by a graphical coordinate indicator being movable on said graphical user interface.

9. The storage medium according to claim 6, wherein the computer program is platform independent and suitable to use on any computer device such as computer, tablet or smartphone.

10. A method of using the computer program stored in the storage medium of claim 6, comprising:
   executing the computer program; and
   adding audio to a motion picture using the program.

11. A method of using the computer program stored in the storage medium of claim 6, comprising:
   executing computer program;
   setting up sensors in a real life event, which react to real life stimuli; and
   adding audio in real time to the real life events by modification of the intensity parameter and the variation parameter from the sensors.

\* \* \* \* \*